March 10, 1931. E. P. STENGER ET AL 1,795,804
MINING MACHINE BIT AND BIT HOLDER
Filed April 15, 1930
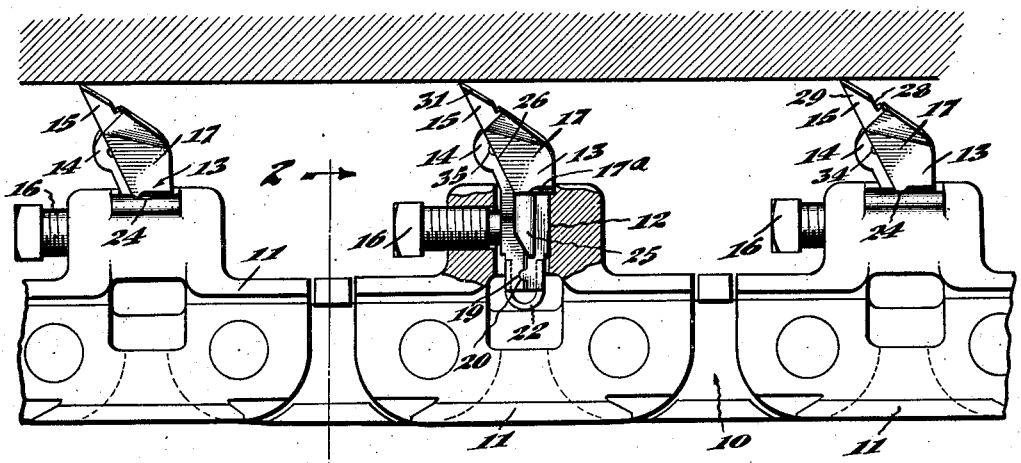

Patented Mar. 10, 1931

1,795,804

UNITED STATES PATENT OFFICE

EDWIN P. STENGER AND JOHN R. CARTLIDGE, OF CINCINNATI, OHIO, AND FRANK CARTLIDGE, OF CHICAGO, ILLINOIS, ASSIGNORS TO THE CINCINNATI MINE MACHINERY COMPANY, OF CINCINNATI, OHIO, A CORPORATION OF OHIO

MINING-MACHINE BIT AND BIT HOLDER

Application filed April 15, 1930. Serial No. 444,553.

This invention relates to mining machinery and is particularly directed to cutter bits or teeth and to the means for mounting the same in a mining machine chain. The type of mining machinery to which these teeth are applied uses an endless chain carrying teeth angularly and outwardly disposed for making a cut in rock, coal, etc. The angle of the teeth in a transverse plane is varied as to successive teeth to make a cut which is sufficiently wide enough to admit the run of chain and its guide. The present invention being primarily directed to the construction of the teeth and holders, it is only necessary, for the purpose of clearly describing and illustrating the same, that reference be had to one link of the cutter chain. Each of these links or lugs as they may be termed, include sockets which are transverse to the longitudinal extent of the chain.

It is well recognized that the average cutter tooth or bit is subjected to an extremely hard usage and constant replacement is necessary. To this end it is desirable that the teeth be easily insertable and that the mode of mounting be extremely simple so that replacement under difficulties, such as in a dark mine and in close quarters, is facilitated. Furthermore, due to the rapidity with which the cutter teeth are damaged, for an economical operation of the machinery, the teeth must be of a form easy to manufacture and not costly to machine. A drop forging is used in the present instance. Because of the character of material which the bits are designed to cut, it is also necessary that the mounting be highly effective for preventing chattering or loosening of the tooth in its holder and also that the holder be unusually efficiently reinforced.

Therefore, it is an object of this invention to provide an improved tooth for use in a mining machine chain, which tooth is reversible and which, due to the form of its attachment or contact portions, permits any variation in the angle of the sharpened or cutting ends of the tooth. This is an important feature in those cases where the teeth are subsequently sharpened and reused. In other words what is herein provided is a reversible cutting tooth which has an attaching shank entirely independent of the cutting ends of the tooth. It is a further object in connection with the above object to provide that the sharpened or cutting ends of the tooth do not contact the holder at any time, thereby maintaining the sharpened condition of the inner end of the tooth not being used.

Another object of this invention is to provide an improved holder for the bit, which holder is readily insertable in the socket of the chain lug or link and which is normally maintained in open or tooth-receiving position, thereby facilitating the introduction of the bit or tooth. It is another object in connection with the foregoing object to provide an efficient binding action for securing the tooth in the holder and to include therein direct shoulder engagements of the tooth with the holder for preventing inward or outward longitudinal movement of the cutter tooth.

It is still another object of this invention to provide what may be termed a one-piece holder. The holder may be initially produced in three pieces, including a pair of jaws pivotally joined at the inner ends and a spring of U-form under outward tension straddling the inner ends of the clamping elements. These parts are solidly joined by welding and thus it is impossible to lose one part of the holder from the rest thereof and the holder is always a compact unit which opens upon release of the jaw closing device.

A further object is to provide transverse reinforcing bosses or longitudinal ribs arranged adjacent the point of greatest strain on a jaw element of the holder and to also include a heavy headed end for the stock which lies outside the lug, supports the tooth, and forms a shoulder for limiting the insertive movement of the holder into the socket of the chain lug or link.

A further object is to provide a clearance behind the tooth extending through the holder to the rear end thereof for permitting the escape of any particles of rock or coal which are forced between the jaws of the holder.

Other objects and certain advantages will be more fully apparent from a description of the accompanying drawing, in which:

Figure 1 is a side elevation of a portion of mining machine chain, illustrating a plurality of the improved cutter teeth and holders in operative position in respective chain links, one of the links of the chain being broken away to more fully illustrate the position of a cutter holder therein.

Figure 2 is a sectional view taken on line 2—2, Figure 1, showing the angular disposition of the cutter, which angle is varied throughout the length of the chain to procure a wide cut.

Figure 3 is a sectional view taken on line 3—3, Figure 2, illustrating in detail the assembled cutter holder and tooth.

Figure 4 is an interior view of one of the clamping jaws of the holder.

Figure 5 is a sectional view taken on line 5—5, Figure 3.

Figure 6 is a sectional view taken on line 6—6, Figure 3, illustrating the reinforced construction of the holder.

Figure 7 is a perspective view of the improved cutter bit or tooth.

Figure 8 is a top plan view of a chain link or lug looking directly into the socket.

The carrier, illustrated as carrying a plurality or row of the holders and cutter teeth of this invention, is an endless chain 10 driven by power. Alternate links 11 of this chain are in the form of lugs providing lateral extensions including sockets 12. These lateral extensions and sockets regarded successively in the length of chain have their angle varied in the transverse plane in which they are disposed. Figure 2 of the drawing illustrates the extreme angle toward one side, these teeth holding sockets spreading out fan like between the illustrated angle and a corresponding angle on the opposite side to make a cut which is of greater width than the thickness of the chain so that, as the chain moves into the cut in the rock, coal, etc., free passage thereof is maintained.

Generally described, clamping jaws 13, 14 permanently fixed together are insertable in each socket of the chain run. These clamping jaws are forced together upon a tooth or bit 15 by means of a screw 16 entering the socket laterally.

Referring to the details of the drawings, one of the clamping jaws, namely, 13, is heavier than the other. The heavier jaw has a head portion 17 of increased thickness providing a shoulder 17ª where it joins the body of the jaw. This shoulder limits the insertive movement of the jaws into the socket of the chain lug (see Figure 1). The tooth 15 is mounted in the headed end of the jaw in a V-shaped groove 18 therein, the shank of the tool being triangular in cross section.

The jaws are pivotally joined at the inner ends thereof. This pivotal connection or hinging is accomplished by means of a lug 19 disposed transversely across the face of one of the jaws, this lug being semicircular in transverse cross section (see Figure 3). A corresponding groove 20 is formed in the adjoining face of the other jaw, this groove being of slightly less depth than the total height of the lug so that a clearance between the jaws is maintained apart from the hinge or pivot.

Adjacent the hinge point of the jaws and in the outer side surfaces of the respective jaws longitudinal grooves 21 are provided, these grooves extending a short distance inwardly from the inner ends of the jaws. A U-shaped spring 22 straddles the inner ends of the pivotally joined jaws, the arms of this spring engaged in the grooves. The grooved surfaces of the jaws are slightly countersunk from the outer surfaces of the jaws and welding material indicated at 23 is applied over these countersunk surfaces for securing the spring in the grooves. The U-shaped spring is under outward tension and is compressed into the grooves at the time of welding. The result is that the jaws are rocked on the pivot in such wise as to normally maintain the outer ends in open tooth receiving condition.

The socket 12 in which the tooth holder is disposed is of rectangular shape with semicircular recesses 24 in its lateral side walls. The jaws of the holder when compressed upon the tool and forced into the socket are of substantially the same outline in cross section with a slight clearance for insertion and clearance longitudinally of the lug for opening movement of the jaws. Bosses 25 are formed on the heavier jaw one on each side thereof, these bosses being semicircular and formed on the same center. The bosses are longitudinally disposed on the jaw sides extending from the head thereof to a point substantially adjacent the pivot. The head and bosses form a heavy reinforcing portion for the jaw and resist the working pressures exerted on the tooth tending to break the jaw. The working thrust of the tooth is toward the heavier jaw and the lighter of the jaws provides a flat tooth engaging surface 26 and fits in a grooved intermediate portion 27 of the heavier jaw.

As shown in Figure 3, the tooth mounted in the V-shaped groove, due to the forwardly exending angle of the groove and head of the jaw, must be secured against inward movement under the working pressures encountered which it will be appreciated are quite heavy. For this purpose the triangular tooth is provided with an abutment shoulder 28 at each end thereof. These abutments are formed entirely independent of the cutting ends of the reversible tooth. The tooth is beveled as at 29 on two of its three faces at each end resulting in cutting points located medially of the width of the unbeveled side 30. The inclined edge marking the jointure of the beveled sides is ground down to flatten the edge as at 31. At the point where this edge meets the longitudinal edge 32 of the tooth or that edge adjacent the unbeveled side, a groove is formed transversely of the tooth to provide the abutment shoulder 28 at right angles to the aforesaid longitudinal edge. These abutments are present at both ends of the tooth and each in its turn is designed to be seated against a seat 33 formed at the inner end of the V-shaped groove in the jaw.

The bottom of the groove from the point of the seat to the hinge point of the jaws follows the contour of the sharpened end of the tooth but is slightly spaced therefrom so as to prevent contact of the cutting end of the tooth with the jaw. This spacing of the jaw continues from the point of the tooth to the inner ends of the jaws so that there is no interference with the engagement of the jaws on the tooth. The unbeveled face of the tooth, being disposed toward the lighter jaw 14, is engaged by the inner flat surface 26 thereof.

A boss 34 transversely disposed across this unbeveled face of the tooth exactly centrally of its length is semicircular in cross section and is engaged in a corresponding groove 35 formed in the engaging face of the jaw. By means of the engagement of this boss and groove which is identical for either position of the tooth, it is provided that the tooth is firmly maintained against any longitudinal displacement. By the additional engagement of either abutment 28 with the seat 33 the tooth is primarily capable of withstanding displacement under inward pressures.

As shown in dot and dash lines in Figure 3, the jaws are capable of rocking movement or spread at their open ends a distance sufficient for clearing the groove and boss to permit easy extraction of the tooth. This possible opening movement is shown to correspond with the dimension of the socket.

As shown in Figure 2, the set screw 16 is mounted in one wall of the socket and is longitudinally disposed relative to the chain link. It is adapted to laterally engage the lighter of the jaws. Thus it is provided that immediately upon the necessity of replacing a given tooth being apparent, the operator has but to loosen the set screw whereupon the spring acts to open the jaws a sufficient amount to permit the extraction of the old tooth and the insertion of the new tooth. It is, therefore, only necessary to manipulate one part, namely, the screw 16 and to thereupon insert the tooth.

The U-shaped spring clip is welded in position so that the holder may be termed a unitary or one-piece holder from which no part can be misplaced or lost. The advantage of this will be obvious when it is noted that these replacements quite often take place under unlighted or badly lighted conditions.

The main tooth holding jaw being strongly reinforced by means of the longitudinal rib or boss joining the head, there is little likelihood of breakage of the tooth holder and the replacement of the teeth is only necessary after both ends of each reversible tooth have been dulled. Since the engagement of the particular abutment on a tooth with the holder is independent of the cutting end of the tooth, it is quite possible to sharpen and change the angle of the cutting end if desired without interfering with the efficient mounting of the tooth in the holder.

Having described our invention, we claim:

1. A bit and holder for use in a mining machine chain, comprising, a pair of clamping jaws pivotally engaged at their rear ends, a spring normally spreading the outer ends of the jaws and a bit attachable between the outer ends of the jaws.

2. A bit holder for use in a mining machine chain, comprising, a pair of clamping jaws, a spring element joining the inner ends of the jaws and normally maintaining the outer ends in bit receptive position.

3. A one-piece bit holder for use in a mining machine chain, comprising, a pair of jaw members having a U-shaped spring member straddling the inner ends of the jaws and welded to the same, said spring normally spreading the bit receiving outer ends of the jaws.

4. A device of the class described, comprising, a pair of clamping jaws joined at one end, a cutter tooth inserted between the opposite ends thereof, said tooth having both ends sharpened, a seat formed in one of the clamping jaws, and an abutment formed on each end of said cutter tooth on portions thereof independent of the cutting ends of the tooth, engagement of either of said abutments on the seat spacing the adjacent sharpened end of the tooth from the clamping jaw.

5. In a device of the class described, comprising, a pair of bit clamping jaws, means for forcing said jaws together, a seat formed in the bit receiving end of one jaw, the other jaw having a groove formed in its bit receiving end, a bit having an abutment for engaging said seat, and a lug for engaging said groove.

6. In a device of the class described, a pair of clamping jaws, means for normally maintaining the outer ends of said jaws in bit receptive position, a V-shaped bit receiving socket in one of said jaws, a seat at the inner end of said groove, a cutter tooth mounted in said socket and having a shoulder engaging said seat, and means for engaging the other jaw against the bit.

7. In a device of the class described, a pair of jaws, a U-shaped clip connecting the inner ends thereof, a bit disposed between the outer ends thereof, said jaws when engaged upon said bit providing a clearance therebetween extending from the inner end of the bit to the rear ends of the jaws.

8. In a device of the class described, a pair of clamping jaws pivotally engaged at one end, a U-shaped spring straddling said pivot ends and under outward tension to force the outer ends of the jaws apart, a tooth mounted between the outer ends of the jaws, said tooth having an abutment formed adjacent its cutting end, a seat formed in one of said clamping jaws engaged by said abutment for limiting inward movement of the bit, a groove formed in the other clamping jaw, and a lug formed on the bit engaging said groove, said latter engagement preventing any longitudinal displacement of the bit and said former engagement taking the work thrust on the tooth.

9. A new article of manufacture, comprising, a cutter tooth triangular in cross section, said tooth beveled at each end on two sides providing a sharpened point medially of the width of the remaining side, an abutment formed at each end of the bit in the edge opposite the latter side and inwardly beyond the sharpened point, and a transverse lug formed intermediate the length of the bit on the aforesaid side.

10. A device of the class described, in combination with a mining machine chain lug, including a socket, a cutter holder, comprising, a pair of jaws, means entering the socket laterally for forcing the jaws together, a tooth mounted between the outer ends of the jaws, and a boss formed on each side of one of said clamping jaws longitudinally thereof adjacent the inner end of the tooth.

11. In a device of the class described, a tooth, a pair of clamping jaws, one of said jaws having a socket therein for receiving said tooth, and an external rib formed on each side of said tooth receiving jaw longitudinally thereof.

12. As a new article of manufacture, a reversible cutter tooth provided with cutting ends beveled on two sides to form cutting points intermediate the width of a third side, transverse notches cut in each end of the edge of the tooth opposite to the unbeveled side at the junctures of the beveled end edges with said opposite edge.

13. A new article of manufacture, comprising, a cutter tooth triangular in cross section, said tooth beveled at each end on two sides to provide a sharpened point medially of the width of the other side, and an abutment formed at each end of the bit in the edge opposite the latter side and inwardly beyond the sharpened point.

14. A bit and holder for use in a mining machine chain, comprising, a pair of clamping jaws pivotally engaged at their rear ends, a bit disposed between the outer ends of the jaws, and means for engaging a jaw for clamping the bit between the jaws.

15. In a device of the class described, a pair of jaws, means joining adjacent ends of the jaws, a bit disposed between the outer ends thereof, said jaws, when engaged upon said bit, providing a clearance therebetween extending from the inner end of the bit to the rear ends of the jaws and means for clamping the jaw upon the bit.

16. In a device of the class described, a pair of clamping jaws, a bit disposed between said jaws, said bit having an abutment formed on its end adjacent its cutting edge, and means for forcing the jaws together against the bit, one of said jaws having a seat formed therein engaged by the abutment of the bit.

In witness whereof, we hereunto subscribe our names.

EDWIN P. STENGER.
JOHN R. CARTLIDGE.
FRANK CARTLIDGE.